United States Patent [19]

Knepler et al.

[11] Patent Number: 5,375,508
[45] Date of Patent: Dec. 27, 1994

[54] DIGITAL BREWER CONTROL

[75] Inventors: John T. Knepler, Chatham; Victor D. Geockner, Auburn, both of Ill.

[73] Assignee: Bunn-O-Matic Corporation, Springfield, Ill.

[21] Appl. No.: 174,822

[22] Filed: Dec. 29, 1993

[51] Int. Cl.5 ............................................. A47J 31/00
[52] U.S. Cl. ....................................... 99/280; 99/283; 99/300; 219/483; 392/498
[58] Field of Search ................. 99/279, 280, 281, 282, 99/283, 295, 299, 300, 304, 305, 307, 302 R; 426/433; 392/442, 449, 498, 451; 219/483

[56] References Cited

U.S. PATENT DOCUMENTS

| | | |
|---|---|---|
| 4,468,406 | 8/1984 | d'Alayer de Costemore d'Arc . |
| 5,044,261 | 9/1991 | Kawazde ............................ 99/280 |
| 5,072,660 | 12/1991 | Helbling ............................. 99/280 |
| 5,134,925 | 8/1992 | Bunn et al. . |
| 5,158,793 | 10/1992 | Helbing . |
| 5,255,593 | 10/1993 | Bunn et al. . |

*Primary Examiner*—Robert W. Jenkins
*Attorney, Agent, or Firm*—Trexler, Bushnell, Giangiorgi & Blackstone, Ltd.

[57] ABSTRACT

A control system for a beverage brewing apparatus which includes a programmable control module and a separate input device. The control system is used with a beverage brewing apparatus of the type having an infusion assembly for retaining and filtering a brewing substance, a heated water source and a water distribution system for transporting water from the heated water source to the infusion assembly. The programmable control module controls numerous adjustable functions associated with the brewer and stores at least one function limit for each of the functions which it controls. The separate input device is selectively attachable to the control module for manipulating the function limits of the programmable function retained and controlled by the control module. Function controls are associated with the input device for selecting a function to manipulate and for incrementing and decrementing the limit or limits of the selected function. The control module and input device allow selection of control limits which affect a valve for controlling water flow from the heated water source to the infusion assembly. These control limits establish a dispensing cycle which periodically dispenses water from the heated water source through the water distribution system to the infusion assembly to prevent overflowing the infusion assembly.

11 Claims, 4 Drawing Sheets

DIGITAL BREWER CONTROL

BACKGROUND

The present invention relates to control systems and devices for use with beverage brewing apparatus and a beverage brewing apparatus incorporating such control devices.

A variety of beverage brewing apparatus are available for brewing beverages ranging from consumer devices to institutional models. The complexity of these brewers can range from a brewer which uses a simple timer to control the opening of a solenoid valve to a complex multi-station multi-function brewing apparatus. At the more simple end of the range, a simplified brewing apparatus may include a timer which controls the opening and closing of the solenoid valve to meter a selected volume of water into the brewing apparatus to infuse a manually measured quantity of beverage brewing substance retained in an infusion assembly such as a filter basket. Temperature control of the brewing water in such a device is typically accomplished using a simple thermostat. At the more complex end of the beverage brewing apparatus range are apparatus which include brewers with multiple batch size selection, multiple brew heads, separate multiple hot water tanks, numerous indicator lamps, sensors, timers as well as other components.

Operators of restaurants, caterers, or other food related industries typically own numerous brewers often including a variety of models ranging from the simple to the more complex. While any given owner may own beverage brewers from only one manufacturer, it is possible that the manufacturer offers a wide variety of beverage brewer models have numerous features. A user must be familiar with the set up and operation of each brewer model and the features of each model. Additionally, the user may desire to set up and operate all of the beverage brewers in a uniform manner such that the beverage produced by the variety of brewers will be consistent and repeatable. A problem arises, however, in that it may be difficult to set up the variety of beverage brewing apparatus in a uniform manner. Additionally, since the prior art beverage brewers are controlled by control panels which are integrated with the beverage brewing apparatus the setting on such beverage brewers may be altered as a result of tampering or accidental misuse.

One way to overcome the problem of uniform set up and operation is for a user to purchase only one type of beverage brewing apparatus. This is an impractical solution because brewing apparatus are often purchased over a period of time, often resulting in modifications to the features and operation of such features within the same model. Additionally, a user will often purchase a specific type of brewer for a specific application, in other words, a user will not purchase a highly complex multi-station brewer when a simple single station device will suffice.

Another problem mentioned hereinabove, is the possibility that a brewer may fall out of adjustment through tampering or accidental misuse. One way to overcome this problem would be to provide a lockout on the brewer to prevent access to the control panel. This can be a problem in and of itself, since the temptation to tamper often induces actual tampering. If some form of lockout device is used with the control panel, it is highly likely that such a device, as well as the control panel, will be damaged in the attempt to tamper with the brewer. Further, such a lock out feature may interfere with or prevent the intentional adjustment of the brewer. As such, it would be valuable to provide a beverage brewer which separates the adjustment function from the general operating function and control of the beverage brewing apparatus.

Another problem with the prior art beverage brewing apparatus is that the infusion assembly is prone to overflowing under certain operating conditions. An example of an operating condition in which an infusion assembly may overflow includes circumstances in which very soft water is used to brew decaffeinated coffee. The characteristics of the soft water and the decaffeinated coffee tend to result in the water having a slower draining rate through the brewing substance resulting in brewing water accumulating in the filter basket of the infusion assembly. Since the flow rate into the infusion assembly is greater than the flow rate out of the infusion assembly, the basket tends to overflow. One way to overcome this problem is to use a bypass structure which allows a portion of the water, which would otherwise overflow the basket, to bypass the filter and flow directly into a collection container. Water which bypasses the filter and the beverage brewing substance retained therein typically dilutes the resulting brewed beverage. Due to the diluting effect of the bypass type basket, an additional quantity of brewing substance must be used in order to achieve a desired taste and consistency of the brewed beverage.

For the forgoing reasons, there is a need for a control system for a beverage brewing apparatus which will accommodate a variety of beverage brewing devices, prevent tampering with or accidental misadjustment of the selected programmable adjustments, and prevent the beverage infusion assembly from overflowing.

OBJECTS AND SUMMARY

A general object of the present invention is to provide a control system for a beverage brewing apparatus which is separate from the brewing apparatus but selectively connectible to the apparatus for making adjustments to various selectable functions of the brewing apparatus.

Another object of the present invention is to provide a control system for a beverage brewing apparatus which prevents tampering with or accidental adjustment of selected programmable adjustments.

Yet another object of the present invention is to provide a control system for a beverage brewing apparatus which intermittently transports water from a heated water source to an infusion assembly to prevent the infusion assembly from overflowing.

Briefly, and in accordance with the foregoing, the present invention envisions a control system for a beverage brewing apparatus which includes a programmable control module and a separate input device. The control system is used with a beverage brewing apparatus of the type having an infusion assembly for retaining and filtering a brewing substance, a heated water source and a water distribution system for transporting water from the heated water source to the infusion assembly. The programmable control module controls numerous adjustable functions associated with the brewer and stores at least one function limit for each of the functions which it controls. The separate input device is selectively attachable to the control module for manipulating the function limits of the programmable function retained and controlled by the control module. Function controls are associated with the input device for selecting a function to manipulate and for incrementing and decrementing the limit or limits of the selected function. The control module and input device allow selection of control limits which affect a valve for controlling water flow from the heated water source to the infusion assembly. These control limits establish a dispensing cycle which periodically dispenses water from the heated water source through the water distribution system to the infusion assembly to prevent overflowing the infusion assembly.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

While the invention may be susceptible to embodiment in different forms, there is shown in the drawings, and herein will be described in detail, embodiments with the understanding that the present description is to be considered an exemplification of the principles of the invention and is not intended to limit the invention to that as illustrated and described herein.

Figures 1, 1A, 2:
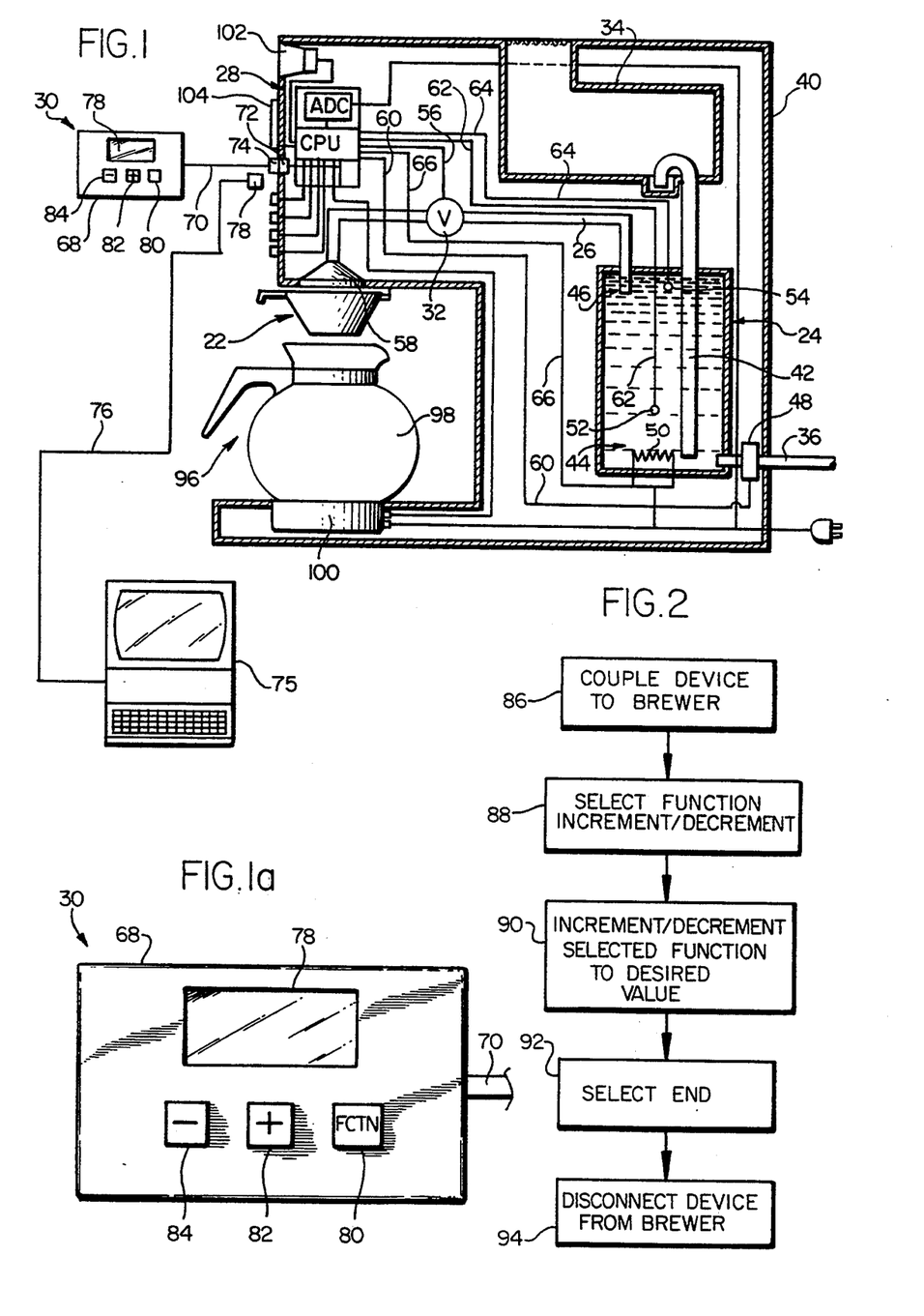
FIG. 1 is a generalized diagram of a beverage brewing apparatus employing the control system of the present invention.
FIG. 1a is an enlarged detail view of an input device as shown in FIG. 1.
FIG. 2 is a simplified flow diagram illustrating the operation of an input device coupled to a control module of the beverage brewing apparatus.

FIG. 1 shows a beverage brewing apparatus 20 of the type having an infusion assembly 22, a heated water reservoir 24 and water distribution system 26 which transports heated water from the heated water reservoir 24 to the infusion assembly 22. As will be described in greater detail hereinbelow, a programmable control circuit or control module 28 is associated with the brewer 20 to control a variety of functions associated with the brewer and for storing limit functions corresponding to associated brewer functions. A separate or independent input device 30 is provided and is selectively couplable with the control circuit 28 for manipulating function limits which are stored in the control circuit 28. A controllable valve 32 is operatively associated with the water distribution system 26 and coupled to the control circuit 28 to control the flow of water from the heated water reservoir to prevent overflowing of the infusion assembly 22 under certain brewing conditions.

Turning to the general operation of the brewer 20, the heated water reservoir 24 retains a quantity of water in a heated condition such that heated water is always available for infusing a beverage brewing substance for producing a brewed beverage. Water enters the heated water reservoir 24 through either of two paths, through a fill basin 34 or through an inlet line or fill line 36. When using the fill basin 34, water is poured through an opening 38 formed through the housing 40 of the brewing apparatus 20 and into the basin 34. Water deposited in the basin 34 flows through a fill tube 42 into a lower portion 44 of the heated water reservoir 24. Water is allowed to flow from the basin 34 into the heated water reservoir 24 through the fill tube 42 by operation of the controllable valve 32 which allows water to flow out of an upper portion 46 of the reservoir 24 to infuse a beverage brewing substance retained in the infusion assembly 22. When water is added to the heated water reservoir 24 through the fill line 36 an inlet valve 48 is operated to allow water to flow through the positively pressurized fill line 36 and into the heated water reservoir 24.

Water dispensed into the heated water reservoir 24 is heated by a heating element 50 positioned in the lower portion 44 of the reservoir 24. A temperature probe 52 is associated with the heated water reservoir 24 to sense the temperature of the water in the reservoir 24. A fill water probe or level sensor 54 is operatively associated with the upper portion 46 of the reservoir 24 to monitor the level or quantity of water retained in the reservoir 24. As will be discussed in greater detail hereinbelow, the heating element 50, temperature sensor 52 and level sensor 54 are coupled to the control circuit 28 for monitoring or affecting characteristics of the water retained in the reservoir 24.

During the operation of a brew cycle, the control circuit 28 operates the controllable valve 32 over line 56 to control flow of water out of the reservoir 24 to the spray head 58 and into the infusion assembly 22. When the controllable valve 32 is operated to open and allow water to flow therethrough, water retained in the basin 34 will flow into the reservoir 24 through the fill tube 42 or, the inlet valve 48 will be operated by the control circuit 28 over line 60 to allow water to flow into the reservoir 24. Water retained in the reservoir is monitored by the temperature sensor 52 which transmits a temperature value over line 62 to the control circuit 28. The control circuit 28 receives and utilizes the temperature value information from the temperature sensor 52 in controlling the brewing apparatus 20. Similarly, the level sensor 54 is coupled to the control circuit 28 via line 64 to provide level value information to the control circuit 28. When the temperature sensor 52 reports a temperature value which falls outside of a selected range or below a lower value, the control circuit 28 activates the heater 50 via control line 66 thereby providing heat energy to raise the temperature of the water. Once the temperature of the water is raised to a selected range or value stored in the control circuit 28, the temperature sensor 52 will sense the temperature and report the temperature value to the control circuit 28. When the temperature of the water sensed at the temperature sensor 52 falls within the selected range or reaches a selected upper value, the control circuit 28 will deactivate the heater 50 to cease heating the water.

The control circuit 28 operates the inlet valve 48 in a similar manner to the heater 50. When the level value sensed by the level sensor 54 falls below a selected range or lower value is stored in the control circuit 28, the control circuit 28 operates the inlet valve 48 to allow water to flow from the fill line 36 into the reservoir 24. When the level value sensed by the level sensor 54 is within a selected range stored in the control circuit 28 the control circuit 28 operates the inlet valve 48 to stop the flow of water through the fill line 36.

Operation of the controllable valve 32 by the control circuit 28 is important to prevent the infusion assembly 22 from overflowing. When the brew cycle is initiated as discussed hereinabove, the controllable valve 32 can be operated by the control circuit 28 to periodically start and stop the flow of water from the reservoir 24 to the infusion assembly 22. In other words, predetermined pulses of water are provided to the infusion assembly 22. The frequency and duration of the pulses are stored as a function in the control circuit 28. An example of a condition which would require a pulsed water flow would be when decaffeinated coffee mead is infused with water from a source which has very soft water. Under these conditions prior art brewers tend to overflow the baskets since the outflow rate from the infusion assembly 22 is substantially mismatched with the inflow rate from the reservoir. Under such a circumstance, the control circuit 28 is programmed to activate the pulsed flow feature thereby operating the controllable valve 32 to produce the pulsed flow function.

Having briefly described the operation of the brewer and the control of various functions by the control circuit 28, the description is now directed toward the input device 30 as shown in FIG. 1, 1a and diagrammed in FIG. 2. The input device 30 provides means for incrementing and decrementing function limits of the brewer 20 which are stored or retained in the control circuit 28. In a general form as shown in FIG. 1a, the input device 30 has a pendant structure which includes a housing 68 and a link or cable 70 which is selectively couplable to the control circuit 28. Selective coupling is achieved by way of a pair of coupling plug members 72, 74, one of which 72 is operatively associated with the housing 40 of the brewer 20 and the other 74 of which is connected to the cable 70. The pair of coupling members 72, 74 are of known construction, for example, standard telecommunications jacksets having a male and a female component such as an RJ11 jackpair. The cable 70 allows the input device 30 to be positioned with respect to the brewer 20 for convenient monitoring and manipulation of the functions stored in the control circuit 28. Alternatively, a standard computer 75 of known construction may be connected to the control circuit 28 via an appropriate link 76 such as via the phone lines or cable such as shown by cable 70. If a modem or telecommunications link 76 is used, the coupling 74 is connected to the phone lines via an appropriate telephone communication cable of known construction.

The input device 30 includes a display 78 for displaying various function identifiers or indicia as well as function parameters. The input device 30 is controlled by a function selection key 80 and increment key 82 and a decrement key 84. When adjusting the values for the parameters of the selected functions, a user selects the function key to select a function (by way of the function indicia) to be inspected or adjusted. When the desired function indicia appears on the display 78, the increment and decrement keys 82, 84 are used to manipulate the function parameters associated with the selected function to a selected value.

With reference to FIG. 2, the input device 30 simplifies the control and adjustment of brewer functions stored in the control circuit 28 and allows the input device 30 to be removed from the brewer 20 after function parameters are adjusted. In the flow diagram of FIG. 2, the input device 30 is coupled to the brewer 20 by way of the coupling members 72, 74 (see, block 86). Next, a function is selected, an exemplary list of functions and parameters is provided hereinbelow (see, block 88). Next, the function parameters of the selected function are incremented or decremented using the appropriate key 82, 84 to adjust the function parameter to a selected or desired value (see, block 90). Steps as shown in blocks 88 and 90 are repeated for each function which is to be reviewed or adjusted. After a user is finished reviewing, setting, or adjusting function parameters, the end function is selected (see, block 92) and the device 30 is disconnected from the brewer (see, block 94).

The input device 30 is generally only required during the initial set-up of the brewer 20 and when changes to the initial set-up are to be made. Therefore, the input device 30 is designed for minimum cost by using a simple display device 78 and only three function control switches 80, 82, 84. The input device 30 is removable after set-up or adjustment and is not required to be attached to the brewer for operation of the brewer. Since the input device 30 is removable, tampering or accidental maladjustment is prevented when the input device is not connected to the brewer. Further, if the input device 30 is allowed to remain connected to the brewer persons who might tamper with or accidentally adjust the function parameters cannot do so unless they know the two passwords discussed hereinabove. Further yet, even if somebody should discover the passwords, the functions allow for the two passwords to be changed thereby limiting access to various functions.

The following is control function list as employed in the digital brewer control circuit 28 as discussed hereinabove. It should be noted, that the function list provides functions for a multi-station brewer which includes at least two brewing stations 96, each station 96 comprising an infusion assembly 22, spray head 58 container 98 and warming pad 100.

| | CONTROL FUNTION LIST | | |
|---|---|---|---|
| | | Range | |
| Number | Function | Minimum | Maximum |
| 1 | Password Number 1: Must be entered to gain access to functions 2 thru 31 | 0000 | 9999 |
| 2 | Set brewing water temp. | 180° F. 82° C. | 210° F. 98° C. |
| 3 | Set full batch volume; used for single head brewer and right side of dual and urn brewers. | 0 oz 0 ml 00:15 | 9999 oz 9999 ml 30:00 |
| 4 | Set water temperature in secondary tank. | 180° F. 82° C. | 210° F. 98° C. |
| 5 | Set temperature at which Ready Lamp turns off. Lamp is off at this temperature and lower. | 140° F. 60° C. | 210° F. 98° C. |
| 6 | Set Ready Lamp differential. This is the amount the water temperature must increase above the "off" temperature to turn the lamp on. | 2° F. 2° C. | 20° F. 20° C. |
| 7 | Set OK-to-Serve timer. This timer starts when the brew solenoid turns off. | 00:15 | 30:00 |
| 8 | Set Freshness timer. This timer starts when the brew solenoid turns off. | 10:00 | 90:00 |
| 9 | Set batch number 2 volume, right side. | Same as function 3 | |
| 10 | Set batch number 3 volume, right side. | Same as function 3 | |

-continued
CONTROL FUNTION LIST

| Number | Function | Range Minimum | Maximum |
|---|---|---|---|
| 11 | Set batch number 4 volume, right side. | Same as function 3 | |
| 12 | Set full batch volume, left side. Used for dual brewers and urn. | Same as function 3 | |
| 13 | Set batch number 2 volume, left side. | Same as function 3 | |
| 14 | Set batch number 3 volume, left side. | Same as function 3 | |
| 15 | Set batch number 4 volume, left side. | Same as function 3 | |
| 16 | Display actual brew water temperature. | Same as function 3 | |
| 17 | Display water temperature in secondary tank. | Same as function 3 | |
| 18 | Set night brewing water temp. Used if brewer is equipped with a day/night switch. | 140° F. 60° C. | 210° F. 98° C. |
| 19 | Set night secondary tank water temp. Used if brewer is equipped with a day/night switch. | 140° F. 60° C. | 210° F. 98° C. |
| 20 | Display software version number. | | |
| 21 | Set first on time. | 00:00 | 10:00 |
| 22 | Set first off time. | 00:00 | 10:00 |
| 23 | Set second on time. | 00:00 | 10:00 |
| 24 | Set second off time. | 00:00 | 10:00 |
| 25 | Set third on time. | 00:00 | 10:00 |
| 26 | Set third off time. | 00:00 | 10:00 |
| 27 | Set fourth on time. | 00:00 | 10:00 |
| 28 | Set fourth off time. | 00:00 | 10:00 |
| 29 | Set fifth on time. | 00:00 | 10:00 |
| 30 | Select new Password 1. | 0000 | 9999 |
| 31 | Password number 2: Must be entered to gain access to all remaining functions. | 0000 | 9999 |
| 32 | Select English or Metric units for temperature and volume. | 0 = English | 1 = Metric |
| 33 | Calibrate Brew temperature sensing probe. | Function 2 setting plus or minus 5° F. | |
| 34 | Calibrate secondary tank temperature sensing probe. | Function 4 setting plus or minus 5° F. | |
| 35 | Enter brewer type. Refer to separate listing of model numbers vs. type to be entered here. | 0000 | 9999 |
| 36 | Select triac or relay control of heater in brew tank. | 0 = relay | 1 = triac |
| 37 | Select triac or relay control of heater in secondary tank. | 0 = relay | 1 = triac |
| 38 | Set temperature control differential. If relay control is used, this is the number of degrees the water temperature must decrease from the settings of functions 2,4,18, or 19 for the tank heater(s) to turn on. | 2° F. 2° C. | 10° F. 10° C. |
| 39 | Select batch unit of measure. | 0 = ounces or ml. | 1 = min: sec |
| 40 | Enable/disable brew lockout when Ready Lamp off. | 0 = disable | 1 = enable |
| 41 | Select value of flow washer. | Select from list. | |
| 42 | Select what is to be displayed by function 0. | 1 = Brew water temp. 2 = Secondary temp. 3 = Remaining spray time. 4 = Others to be defined. | |
| 43 | Test brew tank heater relay. | OFF | On |
| 44 | Test brew tank heater triac. | OFF | On |
| 45 | Test sec. tank heater relay. | OFF | On |
| 46 | Test sec. tank heater triac. | OFF | On |
| 47 | Test right brew solenoid. | OFF | On |
| 48 | Test left brew solenoid. | OFF | On |
| 49 | Test refill solenoid. | OFF | On |
| 50 | Test spare traic. | OFF | On |
| 51 | Test Ready Lamp. | OFF | On |
| 52 | Test Serve Lamp. | OFF | On |
| 53 | Test audible alarm. | OFF | On |
| 54 | Set delay from refill probe dry to solenoid on. | 00:00 | 00:10 |
| 55 | Reserved | | |
| 56 | Select new Password 2. | 0000 | 9999 |
| 57 | Does brewer have a refill sensing probe? | 0 = no | 1 = yes |
| 58 | Is refill solenoid separate from brew solenoid? | 0 = no | 1 = yes |
| 59 | Is there a secondary tank? | 0 = no | 1 = yes |
| 60 | Wait for refill to finish before starting brew? | 0 = no | 1 = yes |
| 61 | Does brewer have a safety (overflow) switch? | 0 = no | 1 = yes |
| 62 | Ready resistance sensed by refill probe. | 000 | 256 |
| 62 | Set refill resistance threshold. | 10 | 230 |

A brief review of the control function list will provide clarification of the brief description of the functions provided in this list. With regard to function number 1, the digital brewer control circuit 28 includes a password access in order to select and review functions 2-31. It should be noted that function 31 is a second password which is used to access functions 32 through 58. Function 2 allows a user, who has provided the proper password in response to function 1, to adjust the brew water temperature within the range of 180°-210° F. Function 3 allows adjustment of the batch volume for the first station of a multi-station brewer or for the single station of a single-station brewer. Function 4 is similar to function 2 in that it allows the control of the water temperature for brewing and it further adjusts the temperature of brewing in a secondary tank. Function 4 is used for a secondary tank in a multi-station brewer and is not applicable when the brewer has a single tank such as with the brewer as shown in FIG. 1. Function 5 controls the operation of a status lamp which indicates that the brewer is ready to brew based on the temperature of the water. The temperature can range from 140°-210° F. and the set temperature typically corresponds to the brewing temperature. Function 6 allows control of the temperature differential and is related to function 5 such that the value set for the temperature 6 parameter is the amount the water temperature must increase above the "off" temperature set for function 5. For example, with reference to functions 2, 4, 5, and 6, the brewing water temperature is set using functions 2 and 4. The low temperature parameter is set using function 5 and the differential temperature above the function 5 temperature at which the lamp is turned on is set by function 6. For example, as water sits in a heated water reservoir 20 it will be heated by the heater 50 which is switched on and off in response to a temperature sensed by the temperature sensor 52. As the heater 50 heats the water in the reservoir, the temperature will increase and when the temperature of the water in the reservoir meets or exceeds the combined temperature of functions 5 and 6, the ready lamp or status indicator will be illuminated thereby indicating to a user that the brewer is ready to brew a beverage. Generally, the combined temperature values for functions 5 and 6 equal or exceed the brewing water temperature value set by functions 2 and 4.

Functions 7 and 8 provide timing functions related to service and freshness. Function 7 provides a timer which times the period of time after the brew solenoid or controllable valve 32 is turned off. In other words, once the function 7 timer starts at a time associated with function 7 after the controllable valve 32 is closed the serviced status lamp will be illuminated thereby indicating to a user that they may remove the container 98 from the warmer 100. The time for function 7 is generally set to allow the brewing water to filter through the brewing substance in the infusion assembly 22 so that when the container 98 is removed from the warmer 100 the brewing has stopped and there will be little chance for brewed beverage to continue to drain onto the warmer. The time related to function 8 is generally an arbitrary time which can set by an operator so that a brewed beverage does not sit at the station for an undesirable length of time. For example, if coffee sits in a container 98 on a warmer 100 for approximately 20 to 30 minutes or longer desired flavor characteristics of the coffee tend to change. The change in the flavor characteristics of the coffee occurs as a result of evaporation caused by the open container 98 sitting on the warmer 100 and the added effect of prolonged exposure to heat and air. As such, many operators find it useful to provide a timer connected to a status lamp or perhaps an audio indicator 102 which is coupled to the control circuit 28 to alert them when the brewed beverage is approaching the end of its consumption life.

Functions 9–15 define batch volumes which can be selected and controlled to establish batch volume over a broad range of volumes. The numerous batch settings allow a coffee station to be set up using a quantity of brewing substance in the infusion assembly and operating a single switch to brew the beverage. For example, while a full container of regular coffee may be desired, only a partial container of a flavored or decaffeinated coffee may be desired. The different batch volumes can be achieved by operating the brewer control when making the coffee by simply selecting either a full, half, or other volume as indicated on the brewer. A number of controls are available to the food service person who is allowed to operate the brewer but is not allowed to set the various function being described herein. The controls which the food service person can use would be, for example, the type of beverage to be brewed, the volume of the beverage to be brewed, an on-off switch to turn the brewer on and off and a switch which is activated to begin the selected type and volume of brew. These controls are of known construction in the form of physical buttons, soft-touch pad, or any other variety of control device such as touch screen interactive. The food service personnel controls are indicated generally as controls 104.

Functions 16 and 17 allow an operator of the input device 30 to see the actual water temperature of the water retained in the tanks for purposes such as diagnostics. Function 20 displays the software version identifier of the software which is operating in the control circuit 28. Functions 18 and 19 are used to set a temperature for the water which is elevated yet may be lower than the temperature required for brewing. These functions operate to reduce the energy consumption of the device during off hours.

Functions 21–29 are timers which provide on and off times to control the controllable valve 32 to provide a pulsed brewing water flow to the infusion assembly 22. As discussed hereinabove, there are situations in which the water flow through the brewing substance retained in the infusion assembly 22 is slower than the flow rate of water into the infusion assembly 22. As such, functions 21–29 are set to operate the controllable valve 32 by way of the control circuit 28 to prevent overflow of the infusion assembly 22 without having to use a bypass-type filter basket. As mentioned in the background section, bypass baskets typically require more brewing substance to produce a desired concentration of beverage which is subsequently diluted with water which bypasses the brewing substance. As such, a time on and time off are set using functions 21–29 to allow water to flow to the infusion assembly 22 during a time on function (21, 23, 25, 27, 29) and to cease the flow of water through the controllable valve 32 during time off functions 22, 24, 26, 28.

Function 30 allows a new password to be selected for function 1. Function 31 requires a second password to gain access to the remaining functions stored in the control circuit 28. Functions 32–41 allow an operator to set basic brewer ranges and identify basic brewer functions. For example, function 32 allows a selection of english or metric units for the volume and temperature parameters established in the preceding functions. Functions 33 and 34 allow calibration of the temperature sensing probes in the respective tanks. The type of brewer may be selected using function 35. In order to use function 35 a list of applicable models must be provided and a corresponding number or identification code selected and entered for function 35. The brewer type need not be that of a single manufacturer but may be those of other manufacturers which are compatible with the digital brewing control circuit 28. As such, the control circuit 28 may be retrofitted for use with brewers from a variety of manufacturers with the appropriate control lines connected thereto. Functions 36 and 37 identify the control of the tank heaters as being controlled by a triac or a relay.

Function 38 allows the operator to set the temperature control differential which establishes the temperature at which the tank heaters are activated. In other words, function 38 establishes the low temperature of the system at which point the heater 50 is activated to raise the temperature in the reservoir 24. Function 38 is similar to function 32 in that it establishes a standard unit of measure in the case of function 38, the unit of temperature. In the case of function 39, the units of measure from which to choose are ounces of water or time based measured of water.

Function 40 can be set to disable or enable the brewer in relation to the status of the function 5 parameter which is the temperature at which the ready to brew status indicator is activated. In other words, the brewer system 20 may be disabled if the function 40 parameter is disabled such that when the water temperature in the reservoir is below a selected temperature (the ready lamp is not illuminated) the system cannot be operated to brew a beverage. Once the ready status indicator is activated, the brewer is once again enabled so that it may be used to brew a beverage. This function prevents the production of inadequate beverages due to insufficient water temperature.

Functions 43–53 provide a series of test parameters to allow an operator or a service person to run a diagnostic test on various elements or devices of the brewing system 20. These functions, 43–53 allow an operator or service person to see if a selected device such as a ready lamp or solenoid valve operates without having to operate the brewer through a brewing cycle.

Function 56 allows a new password to be established for password 2 which is entered for function 31. Functions 57–61 provide inputs to the control circuit 28 to identify whether or not the particular brewer which the control circuit 28 is controlling has various elements. For instance, the existence or absence of a level sensing probe 54 is established by function 57, the existence or absence of a inlet valve 48 separate from a controllable valve 32 is established by function 58, the existence of a secondary tank is established by function 59 a refill function by function 60, the existence or absence of a safety switch by function 61, the resistance sensed by the refill probe 62, and set threshold controls of the refill resistance 63.

Figure 3:
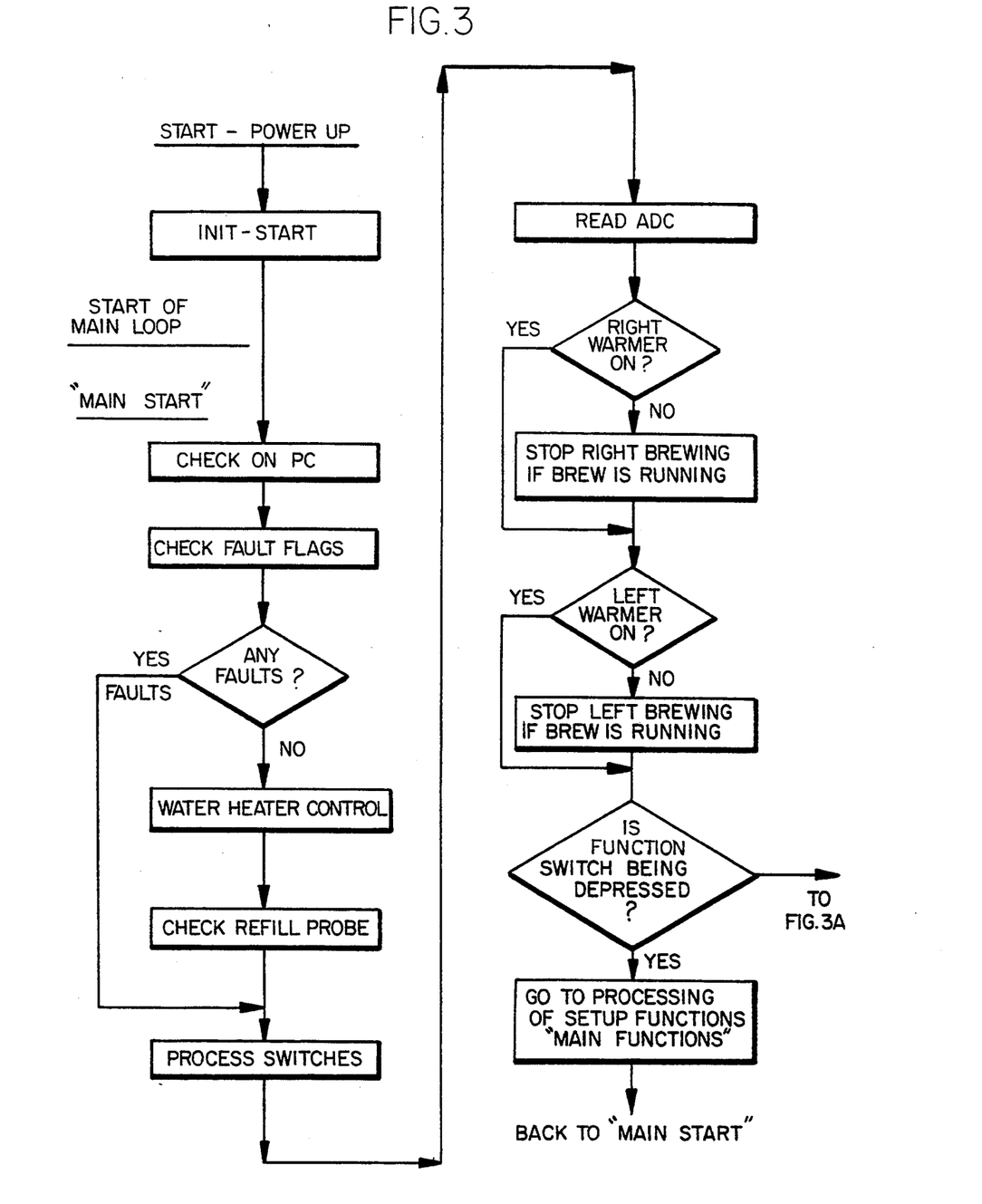
FIG. 3 is a detailed flow diagram of the operation of the control system of the present invention.
Figure 3A:
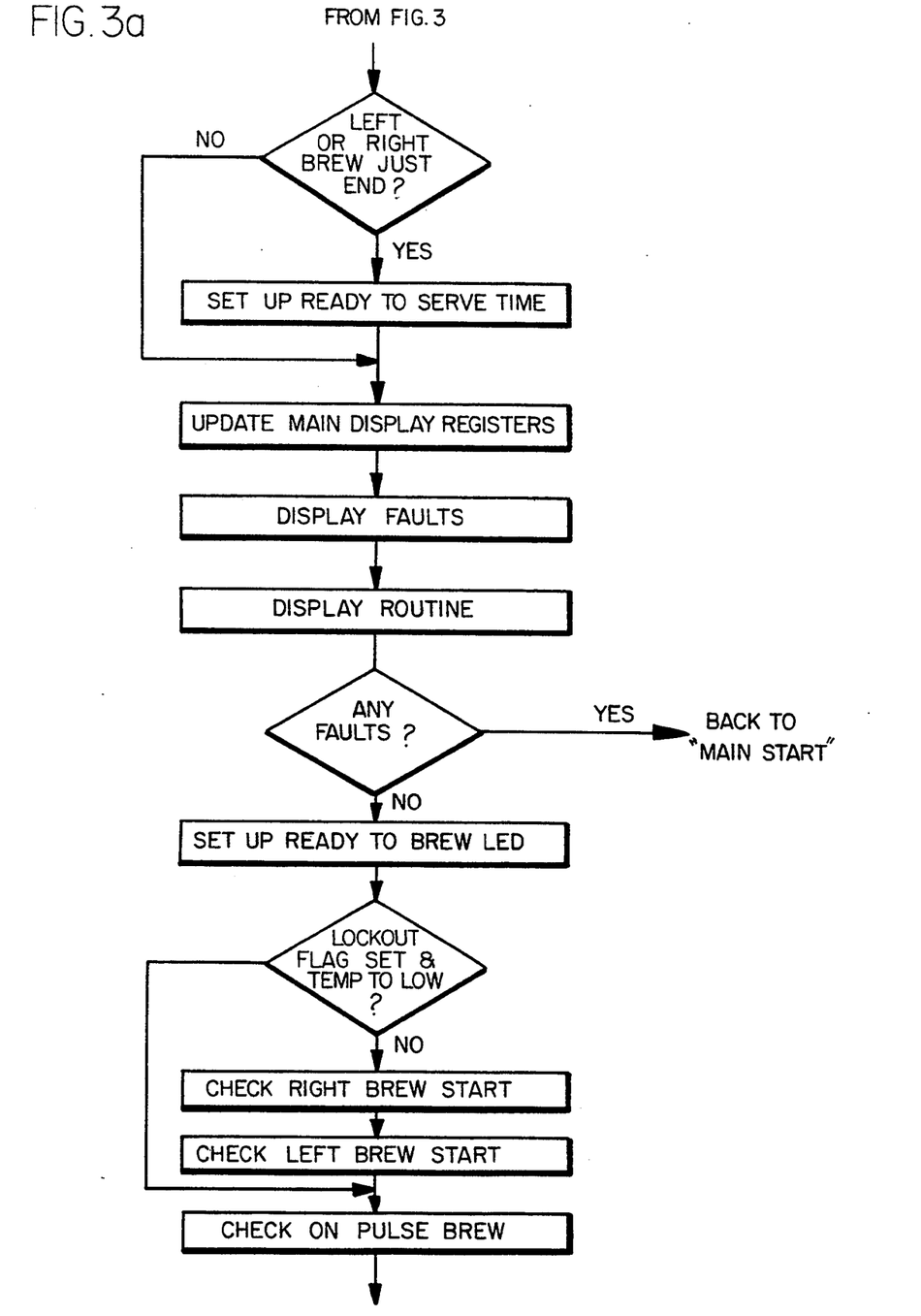
FIG. 3a is a continuation of FIG. 3.
Figure 4:
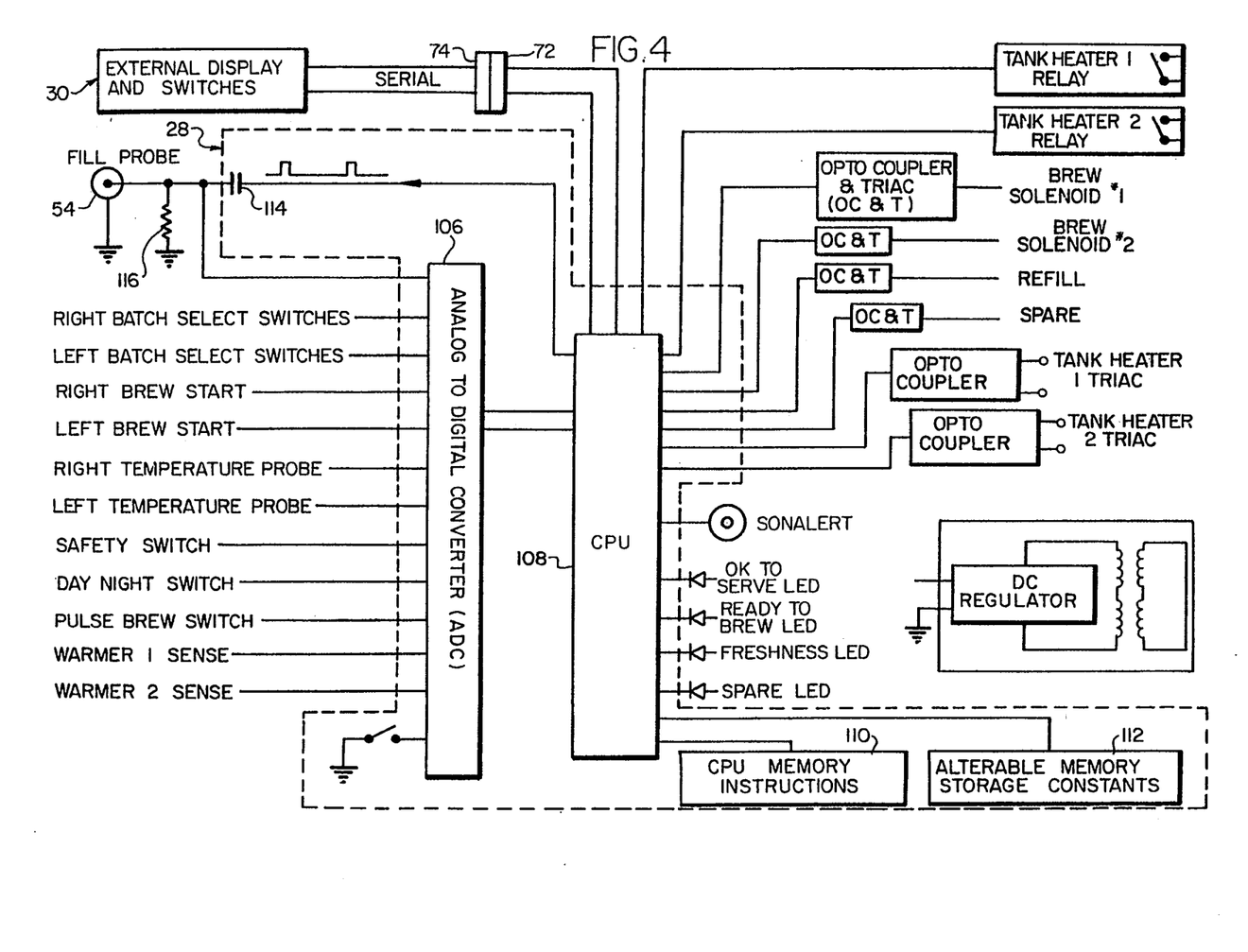
FIG. 4 is a simplified schematic of the input device and control module of the present invention.

Having now discussed the general structure and function of the brewer 20 and the operating parameters in the control circuit 28, further reference is had to FIG. 4 to discuss the control circuit 28 in greater detail. Additionally, the decision flow executed by the control circuit 28 is referred to in FIG. 3 and continuation thereof in FIG. 3a.

As shown in FIG. 4, the control circuit is indicated generally by reference numeral 28. The control circuit includes at least an analog to digital converter (ADC) 106 which is coupled to a CPU 108 including a portion of read-only memory 110 as well as alterable memory 112. Generally, the program or operating instructions are stored in the read-only memory 110 whereas the function parameters as discussed hereinabove are stored in the alterable memory 112. The ADC 106 is of known construction such as the ADC 08118 8-bit Serial I/O A/D Converter with 11-channel Multiplexer as produced by National Semi Conductor Corporation, the product literature and specification material of which is incorporated herein by reference. The CPU is of known construction such as the 83C51FA/80C51FA CHMOS Single-chip Eight-bit Microcontroller as produced by Intel Corporation, the product literature and specification material of which is incorporated herein by reference.

An important feature of the present invention is the level sensor or fill probe 54 which is operated through a novel technique. The fill probe 54 uses a technique whereby a pulse is sent to the fill probe through a capacitor 114. The CPU 108 reads the ADC 106 to determine how fast the voltage decays on the fill probe 54. If the fill probe 54 is covered with water in the reservoir 24, the resistance is low between the probe 54 and the ground 116. If the probe 54 is not covered with water, the resistance between the probe and the ground 116 is high and the capacitor 114 discharges slowly. The passive coupling prevents a DC potential on the fill probe 54 thereby preventing plating of minerals onto the surface of the probe. It is important to prevent the plating of water borne minerals onto the probe because plating causes inaccurate sensor readings. By preventing plating, the sensor readings will be assured to be consistent and accurate. Generally, all inputs to the control circuit 28 are read into the ADC 106.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A brewer for producing brewed beverages of the type having an infusion assembly for retaining and filtering a brewing substance; a heated water reservoir, and a water distribution system for controllably transporting heated water from said heated water reservoir to said infusion assembly for infusing a brewing substance retained therein to produce a brewed beverage; said brewer comprising:

a programmable control circuit operatively associated with said brewer, said control circuit controlling a plurality of functions associated with said brewer and storing at least one function limit for each of the plurality of functions controlled by said control circuit;

a separate input device being selectively couplable with said control circuit for manipulating said function limits of said functions in said control circuit;

means operatively associated with said input device for incrementing and decrementing said function limits of said brewer; and means for controlling water flow from said heated water reservoir to said infusion assembly, said control means being coupled to said programmable control circuit for controlling the flow of water from said heated water reservoir to said infusion assembly for accommodating a slower filtering rate of brewed beverage through said infusion assembly to prevent overflowing said infusion assembly.

2. A control system for controlling a beverage brewer of the type having an infusion assembly for retaining and filtering a brewing substance, a heated water reservoir, and a water distribution system for controllably transporting heated water from said heated water reservoir to said infusion assembly for infusing a brewing substance retained therein to produce a brewed beverage; said control system comprising:

a programmable control circuit operatively associated with said brewer, said control circuit controlling a plurality of functions associated with said brewer and storing at least one function limit for each of the plurality of functions controlled by said control module;

a separate input device being selectively couplable with said control circuit for manipulating said function limits of said functions stored in said control circuit; and means operatively associated with said input device for incrementing and decrementing said function limits of said brewer.

3. A control system for controlling a brewer as recited in claim 2, said input device comprising a pendent including a housing, an input circuit retained in said housing and a cable coupled to said input circuit and extending from said housing a free and of said cable being selectively coupled with a brewer.

4. A control system for controlling a brewer as recited in claim 2, said programmable control circuit includes a CPU, an analog-to-digital converter coupled to said CPU, a programmable memory coupled to said CPU, and a plurality of input/output lines coupled to said programmable control circuit.

5. A control system for controlling a brewer as recited in claim 4, said control system further comprising a fill level sensor including: a probe extending into said heated water reservoir; a capacitor coupled to said probe; said analog-to-digital converter coupled to said capacitor; and said CPU coupled to said analog-to-digital converter for reading the decay of the pulse from said capacitor through said analog-to-digital converter such that the capacitive coupling prevents the development of a DC potential on said probe to prevent plating on said probe.

6. A control system for controlling a brewer as recited in claim 2, said input device further comprising a display component, a link for selectively coupling said input device to said programmable control circuit, and input controls operatively associated with said display and said CPU for selecting a function to be manipulated and manipulating said selected function.

7. A control system for controlling a brewer as recited in claim 6, wherein said input controls include a function selection key, an increment key, and a decrement key.

8. A control system for controlling a brewer as recited in claim 2, wherein said functions include at least one limited function having at least one function set point, said limited function having a prespecified range within which said at least one function set point can be incremented or decremented using said input device.

9. A brewer for producing brewed beverages of the type having an infusion assembly for retaining and filtering a brewing substance and heated water source operatively associated with the infusion assembly for delivering heated water to said infusion assembly for infusing said brewing substance retained therein to produce a brewed beverage;
 a microprocessor operatively associated with said brewer, said microprocessor controlling a plurality of functions associated with said brewer; and
 means for controlling water flow from said heated water source to said infusion assembly, said control means being coupled to said microprocessor, said microprocessor including means for activating said control means for controlling the rate of flow of water from said heated water source to said infusion assembly for preventing overflowing said infusion assembly.

10. A brewer for producing brewed beverages as recited in claim 9, further comprising a heated water line communicating with said heated water source and said infusion assembly, said means for controlling water flow further including a controllable valve disposed in said heated water line, said controllable valve being coupled to said microprocessor such that said microprocessor controls the operation of said controllable valve.

11. A brewer for producing brewed beverages of the type having an infusion assembly for retaining and filtering a brewing substance and heated water source operatively associated with the infusion assembly for delivering heated water to said infusion assembly for infusing said brewing substance retained therein to produce a brewed beverage;
 a microprocessor operatively associated with said brewer, said microprocessor controlling a plurality of functions associated with said brewer;
 a heated water line communicating with said heated water source and said infusion assembly; and
 means for controlling water flow from said heated water source to said infusion assembly said control means being coupled to said microprocessor controlling the flow of water from said heated water source to said infusion assembly for preventing overflowing of said infusion assembly, said means for controlling water flow further including a controllable valve disposed in said heated water line, said controllable valve being coupled to said microprocessor such that said microprocessor controls the operation of said controllable valve, said microprocessor operating said controllable valve to pulse a quantity of water from said heated water source through said heated water line to said infusion assembly to provide a draining interval to allow brewed beverage to drain from said infusion assembly to prevent overflowing said infusion assembly.

* * * * *

UNITED STATES PATENT AND TRADEMARK OFFICE
CERTIFICATE OF CORRECTION

PATENT NO. : 5,375,508
DATED : December 27, 1994
INVENTOR(S) : John T. Knepler and Victor D. Geockner It is certified that error appears in the above-indentified patent and that said Letters Patent is hereby corrected as shown below:

Column 8, Line 27 "62" should be — 63 —

Signed and Sealed this

Fourth Day of April, 1995

Attest:

BRUCE LEHMAN

Attesting Officer

Commissioner of Patents and Trademarks